(12) United States Patent
Koh

(10) Patent No.: US 6,751,537 B2
(45) Date of Patent: Jun. 15, 2004

(54) METHOD FOR CONTROLLING A DAMPER OF A VEHICLE

(75) Inventor: You-Seok Koh, Pyungtaek-Si (KR)

(73) Assignee: Mando Corporation (KR)

(*) Notice: Subject to any disclaimer, the term of this patent is extended or adjusted under 35 U.S.C. 154(b) by 213 days.

(21) Appl. No.: 10/033,870

(22) Filed: Dec. 28, 2001

(65) Prior Publication Data

US 2003/0047994 A1 Mar. 13, 2003

(30) Foreign Application Priority Data

Sep. 12, 2001 (KR) .......................... 2001-56092

(51) Int. Cl.⁷ ................................. G06F 7/00
(52) U.S. Cl. ...................... 701/37; 280/5.507
(58) Field of Search ................ 701/37, 38–36, 701/65; 280/5.507, 5.5, 5.51

(56) References Cited

U.S. PATENT DOCUMENTS 6,556,909 B2 * 4/2003 Matsumoto et al. .......... 701/41

\* cited by examiner

Primary Examiner—William A. Cuchlinski, Jr.
Assistant Examiner—Olga Hernandez
(74) Attorney, Agent, or Firm—Anderson Kill & Olick, PC

(57) ABSTRACT

A method for controlling a damper of a vehicle is provided, wherein the vehicle includes a front damper and a rear damper and a damping force of the dampers is controlled by respective data detected by a steering angle sensor, a vehicle speed sensor and a yaw rate sensor. First, steering angle data, vehicle speed data and yaw rate data are inputted in step (a) and a desired yaw rate is calculated in step (b) by using the steering angle data, the vehicle speed data and a specification of the vehicle. Then, the desired yaw rate is compared in step (c) with the yaw rate data provided from the yaw rate sensor. Thereafter, it is determined in step (d) whether the vehicle is over-steered or under-steered depending on the comparison result obtained in the step (C). Finally, the damping force of the damper is controlled in step (e) in response to the determination result in the step (d).

7 Claims, 3 Drawing Sheets

METHOD FOR CONTROLLING A DAMPER OF A VEHICLE

FIELD OF THE INVENTION

Figure 1:
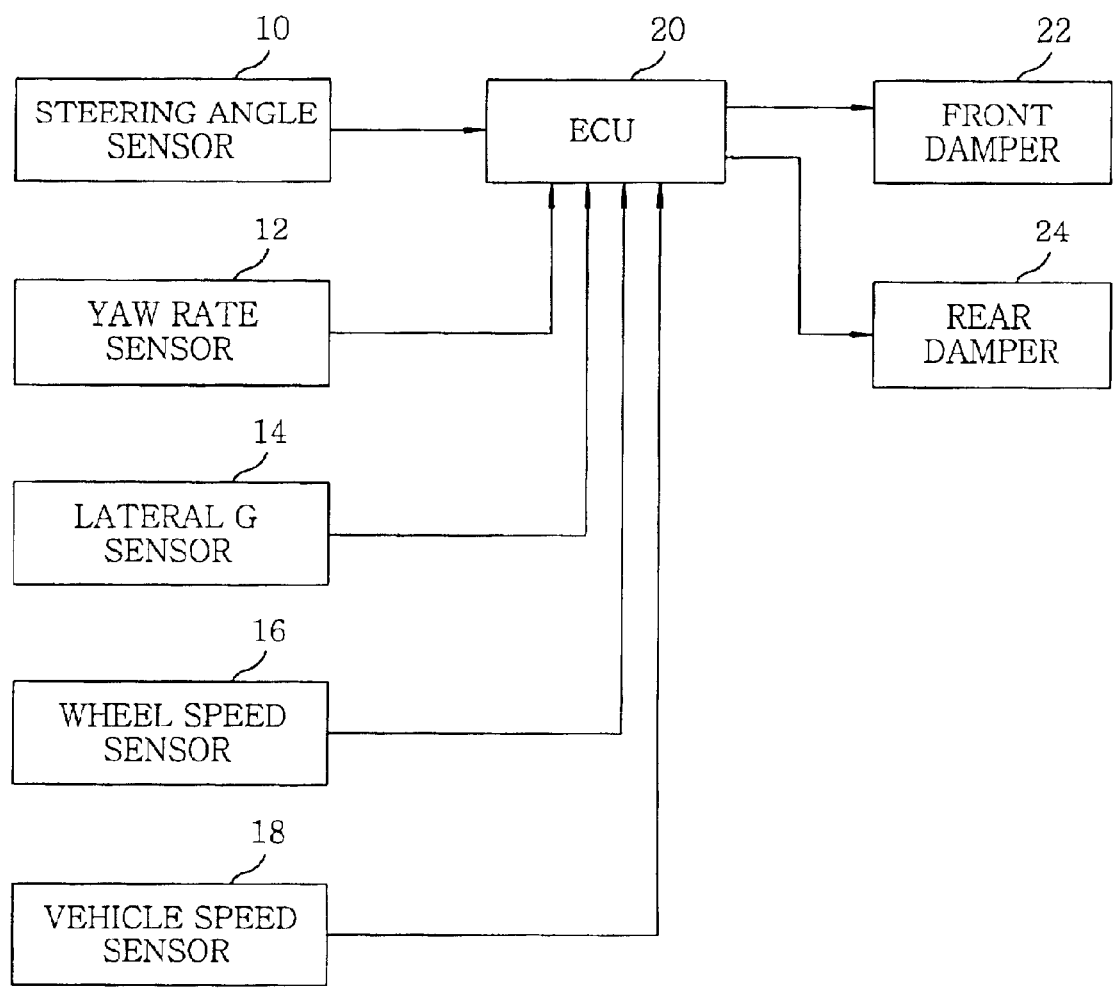

The present invention relates to a method for controlling a damper of a vehicle; and, more particularly, to a method for adjusting a damping force of the damper based on a steering status of the vehicle to thereby improve steering stability.

BACKGROUND OF THE INVENTION

In general, a suspension system is installed at a vehicle to improve ride comfort and roadholding efficiency of the vehicle. The suspension system includes a spring and a shock absorber, i.e., a damper.

Conventionally, the damper is installed in parallel to the spring between a vehicle body and driving wheels of the vehicle. The damper absorbs vibrations of the vehicle that are caused by an impact on the spring at a time when the vehicle travels. By such an operation of the damper, the ride comfort is greatly improved.

The damper operates to reduce vertical kinetic energy and two kinds of dampers are conventionally used; one is a friction damper and the other is an oil damper.

The friction damper uses a frictional resistance. More specifically, the friction damper is operated by the frictional resistance generated between a damper case and a shaft while a coil spring continues to extend and contract. Due to the frictional resistance, the magnitudes of the extensions and contractions of the spring are gradually reduced and finally stopped.

The oil damper, on the other hand, uses viscous oil hermetically contained in the damper case. At the end of the shaft to be inserted into the damper case is prepared a piston. While the spring continuously extends and contracts, the piston in the oil moves up and down. Since the damper oil exhibits a viscosity hundreds times stronger than that of water, movements of the piston generate a considerable amount of resistance. Accordingly, the extensions and the contractions of the spring are gradually stopped.

In recent days, in the meanwhile, an increasing number of vehicles use a damper capable of controlling a damping force thereof to improve the ride comfort. The damping force is controlled by a control logic.

A conventional control logic controls damping force characteristics of the vehicle in relation to vehicle behaviors such as a ride, an anti-roll, an anti-dive, an anti-squat and a speed sensitive, etc.

However, since such a control logic is designed to be applied to a road in a high myu condition having a high frictional coefficient ($\mu$), the control logic cannot cope with a spin phenomenon that occurs frequently on a road surface in a low myu condition with a low frictional coefficient ($\mu$), i.e., a road surface in a slippery status, e.g., on an icy road or a road covered with snow. Moreover, the control logic may not effectively deal with an over-steer or an under-steer, either, that occurs frequently when a vehicle operator makes an abrupt steering action.

SUMMARY OF THE INVENTION

It is, therefore, an object of the present invention to provide a method for controlling a damper of a vehicle, wherein front and rear damping force of the damper is properly adjusted based on a steering status of the vehicle, thereby improving steering stability.

In accordance with a preferred embodiment of the present invention, there is provided a method for controlling a damper of a vehicle, said vehicle including a front damper and a rear damper, a damping force of said dampers being controlled by respective data detected by a steering angle sensor, a vehicle speed sensor and a yaw rate sensor, said method including the steps of:

(a) sensing steering angle data, vehicle speed data and yaw rate data;

(b) calculating a desired yaw rate by using the steering angle data, the vehicle speed data and a specification of the vehicle;

(c) comparing the desired yaw rate with the yaw rate data provided from the yaw rate sensor;

(d) determining whether the vehicle is over-steered or under-steered depending on the comparison result obtained in the step (c); and (e) controlling the damping force of the damper in response to the determination result in the step (d).

In accordance with another embodiment of the present invention, there is provided a method for controlling a damper of a vehicle, said vehicle including a front damper and a rear damper; a damping force of said dampers being controlled by respective data detected by a steering angle sensor, a yaw rate sensor, a lateral G sensor, a wheel speed sensor and a vehicle speed sensor, said method including the steps of:

(a) sensing steering angle data, yaw rate data, lateral G data, wheel speed data and vehicle speed data;

(b) calculating a desired yaw rate by using the steering angle data and the vehicle speed data;

(c) comparing the desired yaw rate with the yaw rate data provided from the yaw rate sensor;

(d) determining whether the vehicle is over-steered or under-steered depending on the comparison result obtained in the step (c); and (e) deciding whether a road surface is in a slippery state or not by using the vehicle speed data, the lateral G data and a specification of the vehicle such as a tread.

(f) controlling the damping force of the damper in response to the determination results made in the steps (d) and (e).

BRIEF DESCRIPTION OF THE INVENTION

Figure 2:
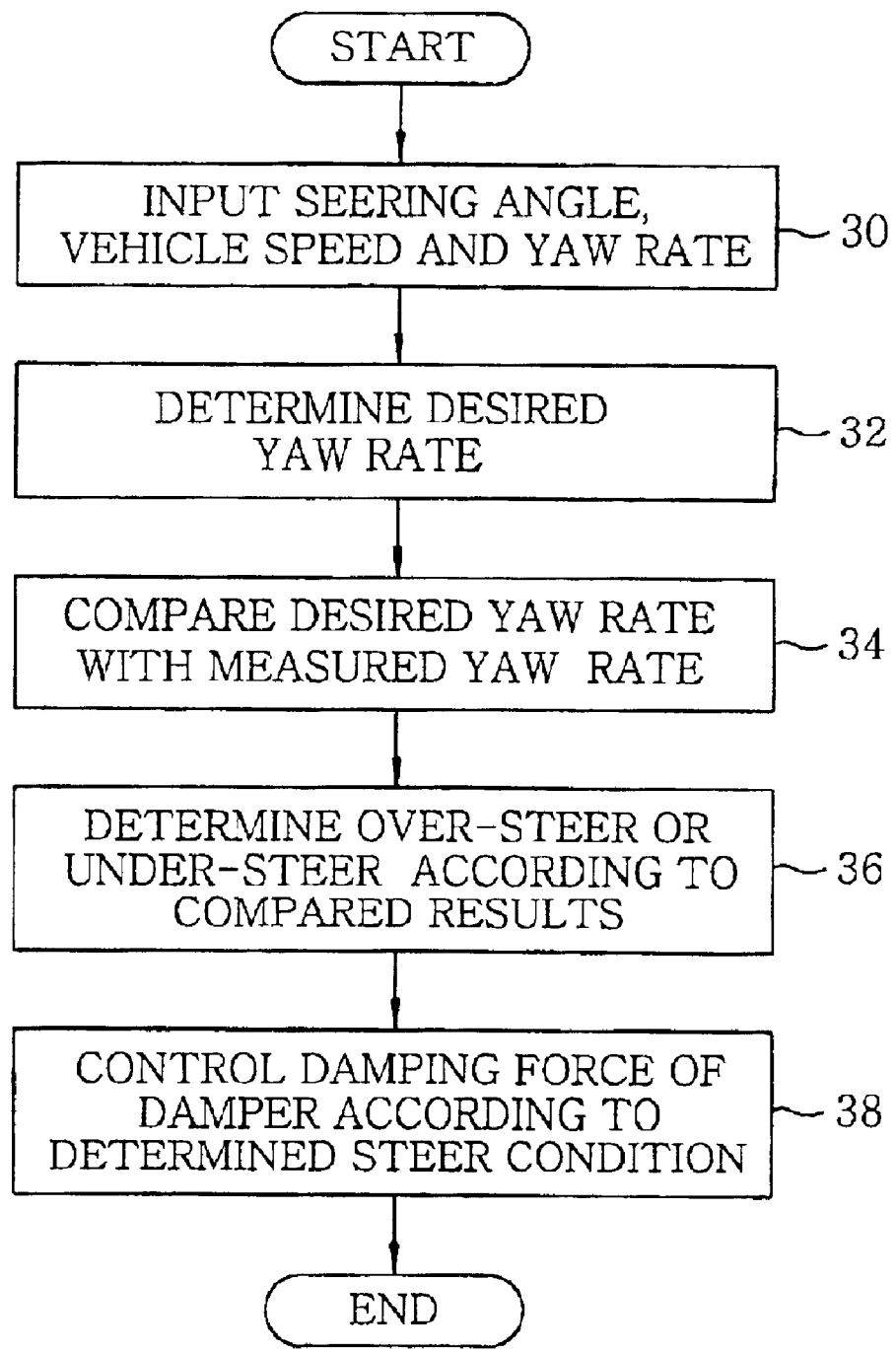
Figure 3:
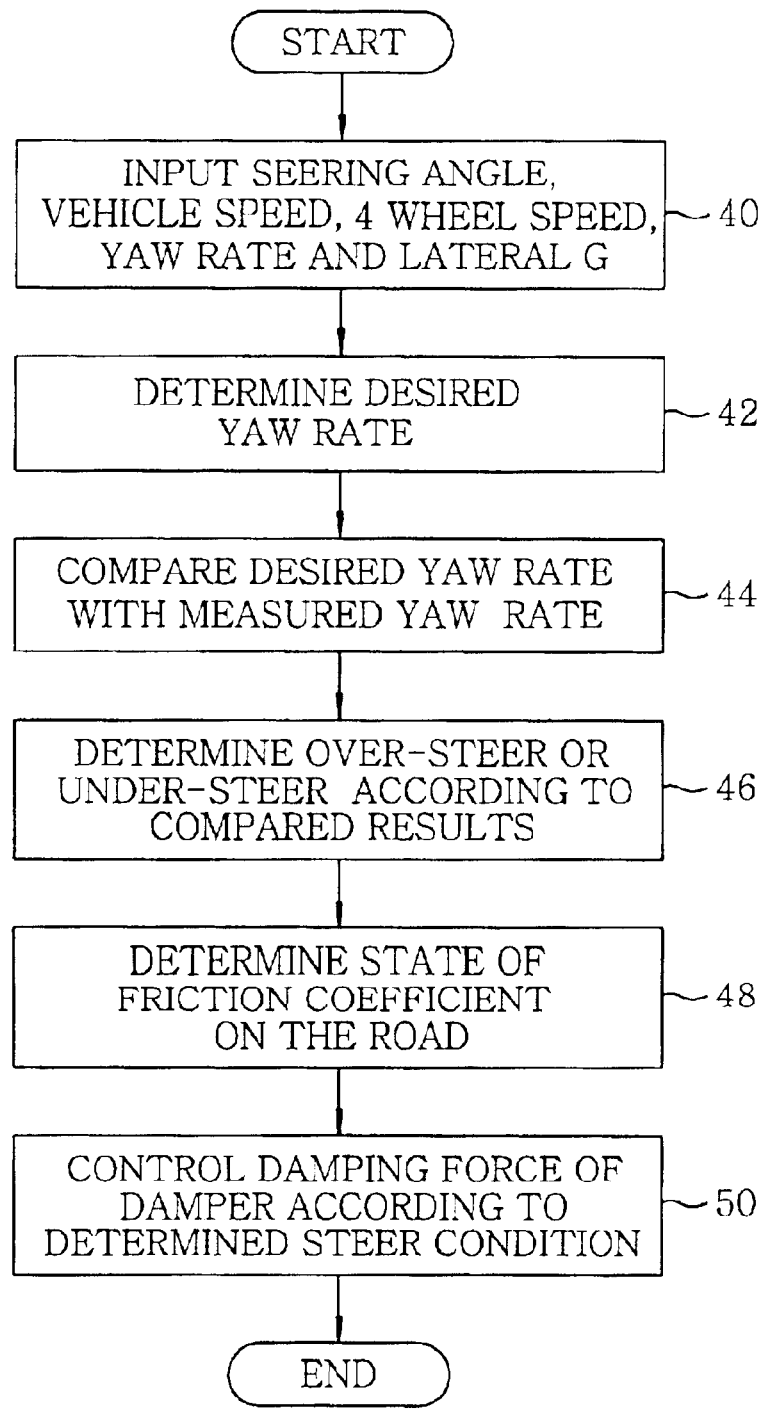

The above and other objects and features of the present invention will become apparent from the following description of preferred embodiments given in conjunction with the accompanying drawings, in which:

FIG. 1 is a block diagram for describing a system for controlling a damper in accordance with the present invention;

FIG. 2 provides a flow chart for describing a method for controlling a damper in accordance with a first embodiment of the present invention; and FIG. 3 shows a flow chart for illustrating a method for controlling a damper in accordance with a second embodiment of the present invention.

DETAILED DESCRIPTION OF THE PREFERRED EMBODIMENTS

Referring to FIG. 1, there is illustrated a system for controlling a damper of a vehicle in accordance with the present invention. An electronic control system 20 controls a damping force of a front damper 22 and a rear damper 24 in response to data provided from a steering angle sensor 10, a yaw rate sensor 12, a lateral G sensor 14, a wheel speed sensor 16 and a vehicle speed sensor 18.

The steering angle sensor 10 detects a steering angle of the vehicle and provides steering angle data to the electronic control system 20.

The yaw rate sensor 12 measures a yaw rate of the vehicle and transfers yaw rate data to the electronic control system 20.

The lateral G sensor 14 detects a lateral G of the vehicle and provides lateral G data to the electronic control system 20.

The wheel speed sensor 16 includes four individual wheel speed sensors prepared at front and rear wheels of the vehicle to detect the speed of each of the wheels. Speed data detected by the wheel speed sensor 16 is provided to the electronic control system 20.

The vehicle speed sensor 18 estimates a speed of the vehicle and provides vehicle speed data to the electronic control system 20.

The electronic control system 20 controls the damping force of the front damper 22 and the rear damper 24 based on the respective data provided from the steering angle sensor 10, the yaw rate sensor 12, the lateral G sensor 14, the wheel speed sensor 16 and the vehicle speed sensor 18.

A desired yaw rate can be calculated by using a specification of the vehicle such as a wheelbase as well as the data provided from the steering angle sensor 10 and the vehicle speed sensor 18.

Further, by using the respective data from the lateral G sensor 14 and the wheel speed sensor 16, a road condition, i.e., whether the road is in a low myu condition with a low frictional coefficient ($\mu$) or not, can be determined.

Referring to FIG. 2, there is provided a flow chart for describing a method for controlling the damper of the vehicle in accordance with a first embodiment of the present invention. FIG. 2 concurrently provides an algorithm of the electronic control system 20.

The electronic control system 20 receives the steering angle data, the yaw rate data and the vehicle speed data respectively provided from the steering angle sensor 10, the yaw rate sensor 12 and the vehicle speed sensor 18 (step 30).

Then, the electronic control system 20 estimates the desired yaw rate by using the steering angle data and the vehicle speed data inputted in the step 30 (step 32).

Thereafter, the electronic control system 20 compares the desired yaw rate with the yaw rate data provided from the yaw rate sensor 12 (step 34).

Afterwards, the electronic control system 20 decides whether the vehicle is over-steered or under-steered on the basis of the comparison result obtained in the step 34 (step 36). More specifically, if $\delta \cdot (\dot{\phi}_d - \dot{\phi}_{ms}) \geq 0$, it is determined that the vehicle is under-steered. If $\delta \cdot (\dot{\phi}_d - \dot{\phi}_{ms}) \leq 0$, on the other hand, it is determined that the vehicle is over-steered. Herein $\dot{\phi}_d$, $\dot{\phi}_{ms}$ and $\delta$ represent the desired yaw rate, the yaw rate data measured by the yaw rate sensor 12 and the steering angle, respectively.

In response to the decision made in the step 36, the electronic control system 20 controls the damping force of each of the front damper 22 and the rear damper 24 (step 38). To be specific, if it is detected that the vehicle is over-steered, the damping force of the rear wheel is reduced while that of the front wheel is increased. If it is found that the vehicle is under-steered, on the other hand, the damping force of the rear wheel is increased while that of the front wheel is decreased. This method for controlling the damping force of the damper is based on the fact that the more a damping force decreases, the more a grounding force increases during a steering operation. This damping force controlling method can be applied regardless of whether the vehicle turns in a left direction or in a right direction.

Referring to FIG. 3, the electronic control system (20) preferably receives the steering angle data, the yaw rate data, the lateral G data, the wheel speed data and the vehicle speed data respectively provided from the steering angle sensor 10, the yaw rate sensor 12, the lateral G sensor 14, the wheel speed sensor 16 and the vehicle speed sensor 18 (step 40).

Then, the electronic control system 20 estimates the desired yaw rate by using the steering angle data and the vehicle speed data inputted in the step 40 (step 42).

Thereafter, the electronic control system 20 compares the desired yaw rate with the yaw rate data provided from the yaw rate sensor 12 (step 44).

Afterwards, the electronic control system 20 decides whether the vehicle is over-steered or under-steered on the basis of the comparison result obtained in the step 44 (step 46). Herein, if a $\delta \cdot (\dot{\phi}_d - \dot{\phi}_{ms}) \geq 0$, it is determined that the vehicle is under-steered while if when $\delta \cdot (\dot{\phi}_d - \dot{\phi}_{ms}) \leq 0$, it is determined that the vehicle is over-steered.

Then, the electronic control system 20 decides whether the road is in the slippery status or not by using the lateral G data as well as the vehicle speed data and a specification of the vehicle such as a tread. For instance, if the difference between the measured lateral G from the lateral G sensor 14 and the calculated lateral G determined from the vehicle speed data and the specification of the vehicle such as the tread is larger than a predetermined level, the road surface is decided to be in the slippery status.

In response to the decisions made in the steps 46 and 48, the electronic control system 20 controls the damping force of each of the front damper 22 and the rear damper 24 (step 50). To be specific, if it is detected that the vehicle is over-steered, the damping force of the rear wheel is reduced while that of the front wheel is increased. If it is found that the vehicle is under-steered, on the other hand, the damping force of the rear wheel is increased while that of the front wheel is decreased. This method for controlling the damping force of the damper is based on the fact that the more the damping force decreases, the more the grounding force increases during the steering operation. This damping force controlling method can be applied regardless of whether the vehicle turns in a left direction or a right direction.

As described above, the present invention allows the damping force of the front and rear dampers to be properly adjusted depending on the steering status. Accordingly, the steering stability and the ride comfort can be greatly improved.

While the present invention has been shown and described with respect to the preferred embodiment, it will be understood by those skilled in the art that various changes and modifications may be made without departing from the spirit and scope of the present invention as defined in the following claims.

What is claimed is:

1. A method for controlling a damper of a vehicle, said vehicle including a front damper and a rear damper, a damping force of said dampers being controlled by respective data detected by a steering angle sensor, a vehicle speed sensor and a yaw rate sensor, said method comprising the steps of:

(a) sensing steering angle data, vehicle speed data and yaw rate data;

(b) calculating a desired yaw rate by using the steering angle data, the vehicle speed data and a specification of the vehicle;

(c) comparing the desired yaw rate with the yaw rate data provided from the yaw rate sensor;

(d) determining whether the vehicle is over-steered or under-steered depending on the comparison result obtained in the step (c); and (e) controlling the damping force of the damper in response to the determination result in the step (d).

2. The method of claim 1, wherein if $\delta \cdot (\dot{\phi}_d - \dot{\phi}_{ms}) \geq 0$, it is determined in the step (d) that the vehicle is under-steered while if when $\delta \cdot (\dot{\phi}_d - \dot{\phi}_{ms}) \leq 0$, it is determined in the step (d) that the vehicle is over-steered, $\dot{\phi}_d, \dot{\phi}_{ms}$ and $\delta$ representing the desired yaw rate, the yaw rate data measured by the yaw rate sensor 12 and the steering angle, respectively.

3. The method of claim 1, wherein if it is determined in the step (d) that the vehicle is over-steered, the damping force of the rear wheel is decreased in the step (e) while the damping force of the front wheel is increased and if it is determined in the step (d) that the vehicle is under-steered, the damping force of the rear wheel is increased in the step (e) while the damping force of the front wheel is decreased.

4. A method for controlling a damper of a vehicle, said vehicle including a front damper and a rear damper, a damping force of said dampers being controlled by respective data detected by a steering angle sensor, a yaw rate sensor, a lateral G sensor, a wheel speed sensor and a vehicle speed sensor, said method comprising the steps of:

(a) sensing steering angle data, yaw rate data, lateral G data, wheel speed data and vehicle speed data;

(b) calculating a desired yaw rate by using the steering angle data and the vehicle speed data;

(c) comparing the desired yaw rate with the yaw rate data provided from the yaw rate sensor;

(d) determining whether the vehicle is over-steered or under-steered depending on the comparison result obtained in the step (c);

(e) deciding whether a road surface is in a slippery state or not by using the vehicle speed data, the lateral G data and a specification of the vehicle; and (f) controlling the damping force of the damper in response to the determination results made in the steps (d) and (e).

5. The method of claim 4, wherein if $\delta \cdot (\dot{\phi}_d - \dot{\phi}_{ms}) \geq 0$, it is determined in the step (d) that the vehicle is under-steered while if when $\delta \cdot (\dot{\phi}_d - \dot{\phi}_{ms}) \leq 0$, it is determined in the step (d) that the vehicle is over-steered, $\dot{\phi}_d, \dot{\phi}_{ms}$ and $\delta$ representing the desired yaw rate, the yaw rate data measured by the yaw rate sensor 12 and the steering angle, respectively.

6. The method of claim 4, wherein whether the road surface is in the slippery status or not is determined in the step (e) by comparing the difference between the measured lateral G data and a calculated lateral G determined from the vehicle speed data and the specification of the vehicle such with a predetermined value.

7. The method of claim 3, wherein if it is determined in the step (d) that the vehicle is over-steered and the road is found in the step (e) to be in a low myu condition, the damping force of the rear wheel is decreased in the step (f) while that of the front wheel is increased and if it is determined in the step (d) that the vehicle is under-steered and the road is found in the step (e) to be in the low myu condition, the damping force of the rear wheel is increased in the step (f) while that of the front wheel is decreased.

* * * * *